(12) United States Patent
Sieren et al.

(10) Patent No.: US 8,843,931 B2
(45) Date of Patent: Sep. 23, 2014

(54) SYSTEM AND METHOD FOR IDENTIFYING BUSINESS CRITICAL PROCESSES

(75) Inventors: Bernd Sieren, Wadgassen-Differten (DE); Bjoern Panter, Saabruecken (DE); Dominik Held, Waghaeusel (DE); Juergen Mahler, Malsch (DE); Mahadevan Venkata, Mannheim (DE); Thomas Fischer, Waldkirch (DE)

(73) Assignee: SAP AG, Walldorf (DE)

( * ) Notice: Subject to any disclaimer, the term of this patent is extended or adjusted under 35 U.S.C. 154(b) by 298 days.

(21) Appl. No.: 13/537,418

(22) Filed: Jun. 29, 2012

(65) Prior Publication Data

US 2014/0007112 A1  Jan. 2, 2014

(51) Int. Cl.
*G06F 9/455* (2006.01)

(52) U.S. Cl.
USPC ............ 718/103; 718/102; 709/224; 709/201

(58) Field of Classification Search
None
See application file for complete search history.

(56) References Cited

U.S. PATENT DOCUMENTS

| | | | |
|---|---|---|---|
| 6,792,460 B2 * | 9/2004 | Oulu et al. | 709/224 |
| 7,623,129 B2 * | 11/2009 | Sagalov | 345/440 |
| 2006/0085788 A1 * | 4/2006 | Amir et al. | 718/100 |
| 2006/0143291 A1 * | 6/2006 | Hayamatsu | 709/224 |
| 2009/0327482 A1 * | 12/2009 | Malhotra et al. | 709/224 |
| 2011/0004682 A1 * | 1/2011 | Honnold et al. | 709/224 |

\* cited by examiner

*Primary Examiner* — Lewis A Bullock, Jr.
*Assistant Examiner* — Wynuel Aquino
(74) *Attorney, Agent, or Firm* — Schwegman Lundberg & Woessner, P.A.

(57) ABSTRACT

A computer system determines a first criticality relating to frequency of execution of computer programs, a second criticality relating to frequency of execution of transactions, a third criticality relating to a number of users who execute the transactions, a fourth criticality relating to programs that modify the database tables having a large change in data, and a fifth criticality relating to the amount to time that each computer program is executed and the amount of time that each transaction is executed. The system determines intersections among the criticalities, and assigns a weighted value to each of the intersections. The system determines an overall criticality for a particular computer program or a particular transaction. The overall criticality is a function of the number of intersections in which the particular computer program or the particular transaction appears and the weighted values assigned to the intersections.

16 Claims, 4 Drawing Sheets

SYSTEM AND METHOD FOR IDENTIFYING BUSINESS CRITICAL PROCESSES

TECHNICAL FIELD

The present disclosure relates to a system and method for identifying business critical processes.

BACKGROUND

Most computer systems that are not insubstantial in size include many business processes, many programs, and/or many transactions. In these computer systems, normally some of these processes, programs, and transactions are more important or critical than others. However, it is difficult to determine among the multitude of processes, programs, and transactions which are the most critical and which are the least critical. Such information would be useful and could be used to reduce the costs of testing, change management, and business monitoring.

DETAILED DESCRIPTION

Figure 1:
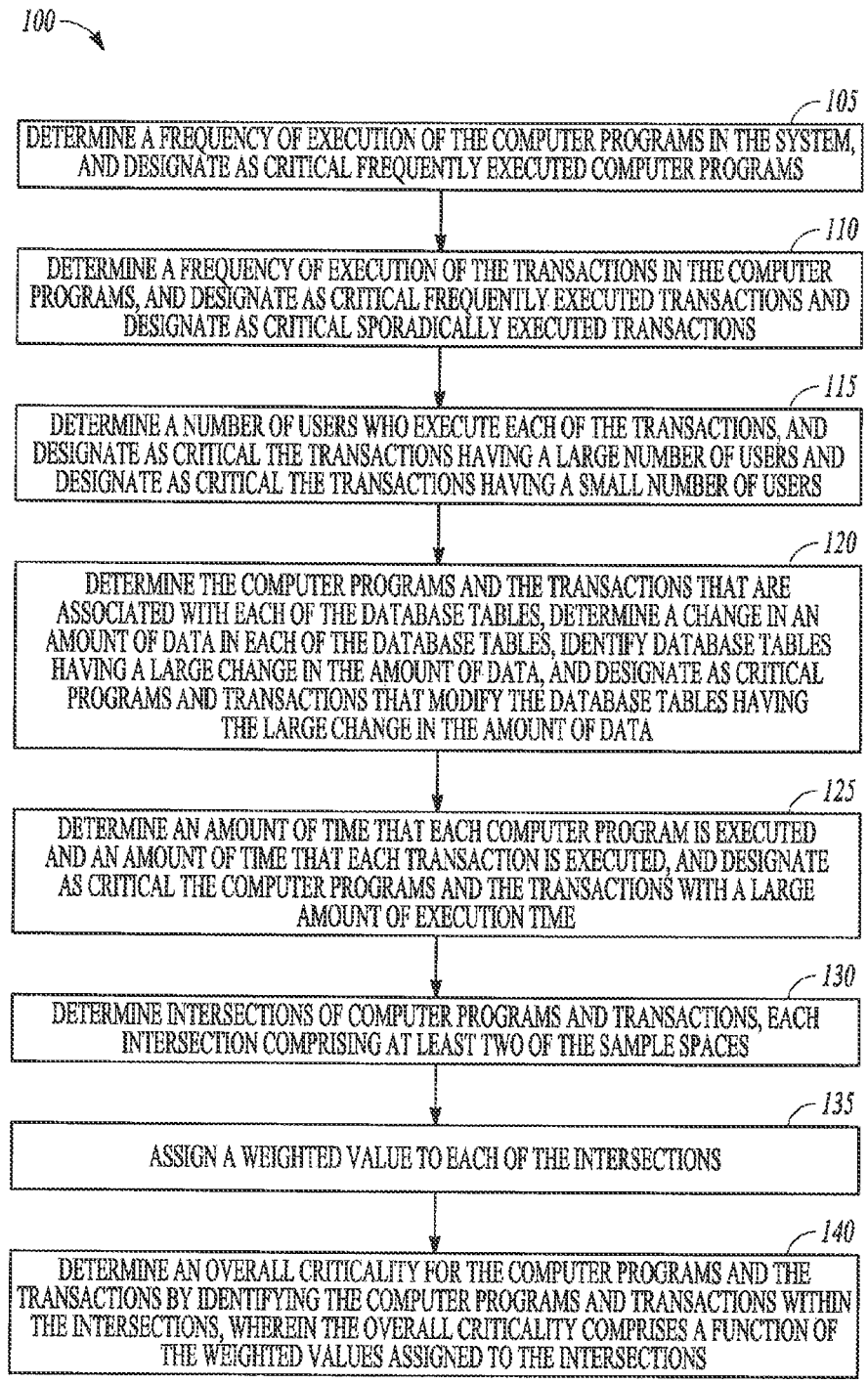
FIG. 1 is a flowchart-like diagram illustrating the features and process steps of an example embodiment of a system and method to identify business critical programs and transactions.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, a computer system includes a processor and a storage device that are configured to identify the business criticality of a system by identifying the business criticalities of the components of the system. Business criticality refers to the importance of computer programs and transactions within the system to the overall proper functioning of the system relative to other computer programs and transactions in the system. In an embodiment, computer program execution is generally controlled by the system, and transactions are generally programs that are executed directly by a user. Both computer programs and transactions in general can be referred to as processes, computer processes, and/or business processes.

In a general embodiment, the business criticality of the programs and transactions in a system are determined as follows. A number of sample spaces are identified and defined. These sample spaces define parameters that are used to determine the business criticality of the programs and transactions as disclosed in detail below. For example, a first sample space may be defined as the computer programs having the most number of users (or the least number of users) who use the computer program. Then, the computer programs and transactions that meet the criteria or parameters (that is, are determined to be critical in that sample space by being above or below a threshold) of a sample space are identified. Several combinations of two or more sample spaces are identified and referred to as intersections. These intersections are assigned a weight. The weight rates each particular intersection as to its importance or criticality. The programs and transactions can be identified as critical depending on their presence or absence in one or more intersections.

In a more specific embodiment, the system gathers use statistics about the programs, transactions, and databases in the system. The system can gather statistics about all the programs, transactions, and databases in the system, or only a subset or a subsystem of the programs, transactions, and databases. Additionally, while the particular embodiment discussed herein includes five sample spaces, depending upon the particular system, more or less sample spaces could be used.

A first sample space relates to a statistic of a frequency of execution of the computer programs in the system. (FIG. 1, No. 105) For example, the statistics may indicate that a first program is executed 24 times per day, a second program is executed 12 times per day, a third program is executed only one time per day, a fourth program is executed only one time per month, and so on with the other programs in the system. This first sample space does not relate to whether there is a single user or multiple users who execute the computer program. It is only concerned with how often or the frequency of the program execution irrespective of the user involved with the execution. The system sorts all the programs in the system by frequency of execution, and the system designates as critical the most frequently executed programs. The manner in which the system determines the programs to designate as the most frequently executed in explained in detail below.

A second sample space relates to a statistic of frequency of execution of the transactions in the system. (FIG. 1, No. 110) For example, a first transaction may be executed 100 times per day, a second transaction may be executed 80 times per day, a third transaction may be executed 8 times per day, and so on and so forth with other transactions in the system. If a transaction is executed very frequently in the system, then by the very nature of its frequent execution, it is important in the criticality determination. However, a transaction that is executed sporadically or infrequently can also be considered important in the criticality determination. For example, if a transaction is executed only once a month, such a transaction can have an effect for the entire month, and hence it can be critical. Unlike the first sample space that relates to frequency of program execution, the identity of the user who executes the transactions is noteworthy in the criticality determination of the second sample space. For example, if a transaction is only executed once per month, and a single individual is involved with that execution, then a departure or other absence of that person could have a serious effect on the system. Consequently, the system sorts all the transactions in the system by frequency of execution, and the system designates as critical the most frequently executed transactions and the least frequently executed transactions. The algorithm that the system uses to determine the transactions to designate as most frequently executed and least frequently executed is explained in detail below.

A third sample space relates to a statistic of a number of users who execute each of the transactions in the system. (FIG. 1, No. 115) For example, the statistics may indicate that a first transaction is executed by 18 different users, a second transaction is executed by 12 different users, a third transaction is executed by only 1 user, and so on with the other transactions in the system. By its very nature, and unlike the first sample space, this third sample space deals with the number of users. A transaction could therefore be considered important in the criticality determination when there are many users who execute the transaction. That is, the more users who execute the transaction, the more important the transaction must be. However, a transaction may also be important if only one user or a few users execute the transaction, since that one user may be an important end user such as an executive of a corporation, or the one user may posses all the knowledge regarding that transaction, and such knowledge would be difficult to replace if that user left the company. The system sorts all the transactions in the system by the number of users who execute each particular transaction, and the system designates as critical the transactions that are executed by a large number of users and the transactions that are executed by a small number of users. The manner in which the system determines the transactions to designate as having the most number of users and the transactions as having the least number of users is explained in detail below.

A fourth sample space relates to a statistic of the amount of data change in each particular database table. (FIG. 1, No. 120). For example, the statistics may indicate that a first database table increased by 10 megabytes in a month, a second database table increased by 7 megabytes in a month, a third database table increased by 2 megabytes in a month, a fourth database table decreased by 12 megabytes in a month, and so on and so forth with the other database tables in the system. In making this statistical determination, the system first determines the computer programs and the transactions that are associated with each of the database tables. Second, the system determines the change in the amount of data in each of the database tables. Third, the system identifies the database tables that have a large change in the amount of data. Fourth, the system designates as critical the programs and transaction that modify the database tables that have the large change in the amount of data. Like in the first sample space, this fourth sample space is not concerned with whether it is a single user or multiple users, single programs or multiple programs, or single transactions or multiple transactions that cause the increase or decrease in the amount of data in a database table. Rather, this embodiment is only concerned with how much a database table increases or decreases in size irrespective of the user(s), transaction(s), or program(s) responsible for the increase or decrease (although the programs and transactions that cause that increase or decrease are identified). The system sorts all the database tables in the system by the amount of increase or decrease in data therein, and the system designates as critical the programs and transactions that are associated with these database tables that have experienced the greatest increase in size or amount of data stored in the database table. The manner in which the system determines the database tables that have experienced enough change in data to be designated as critical is explained in detail below.

A fifth sample space relates to a statistic of the amount of time that either a computer program is executed or the amount of time that a transaction is executed. (FIG. 1, No. 125) In an embodiment, the amount of time relates to the maximum amount of execution time for a program or transaction. The maximum amount of execution time could be important because there may or may not be an adequate amount of time to execute a program or transaction (for example, there is not enough processor time available, or the results are needed before the program or transaction can finish executing). For example, the statistics may indicate that a first program or transaction is executed 6 hours per day, a second program or transaction is executed 3 hours per day, a third program or transaction is executed only 30 minutes per day, and so on and so forth with the other programs and transactions in the system. This fifth sample space is not concerned with whether it is a single user or multiple users who are executing the program or transaction. Rather, this sample space is only concerned with the amount of time of program or transaction execution irrespective of the user involved with the execution. The system sorts all the programs and transactions in the system by amount of execution time, and the system designates as critical the programs and transactions having the most amount of execution time. The manner in which the system determines the programs and transactions to designate as having the most execution time is explained in detail below.

After generating the five sample spaces as outlined above, the computer processor examines the intersections (FIG. 1, No. 130) that have been identified (e.g., sample spaces 1, 4, and 5), and determines if any programs or transactions fall in the intersection (i.e., a computer program or transaction that is identified as critical in each of sample spaces 1, 4, and 5), and hence are business critical. An intersection includes two or more sample spaces. A weighted value is assigned to each intersection. (FIG. 1, No. 135). Then, an overall criticality for a particular computer program or a particular transaction is determined. The overall criticality for the particular computer program or the particular transaction is a function of a number of intersections in which the particular computer program or the particular transaction appears and the weighted values assigned to the intersections. (FIG. 1, No. 140)

For example, if it has been determined that business criticality can be best determined as any program that is a most frequently executed program, any program that is associated with a database table that has experienced the greatest increase in size or amount of data stored in the database table, and any program having a large amount of execution time, then that program is critical in the overall system criticality scheme. That is, if the program has been identified as critical in the first sample space, the fourth sample space, and the fifth sample space. Consequently, in general, the number of intersections that a program or transaction falls into is determined, and then the weight assigned to those intersections is considered. So if a particular program or transaction is identified as being critical within some intersections, but that particular program or transaction is not identified as critical in other intersections, the program or transaction may still be identified as being overall critical, especially if the intersection in which the program or transaction does not appear have been assigned a low weight. In other words, the overall criticality of a particular computer program or a particular transaction can be considered high when the particular computer program or the particular transaction is present in a majority of intersections and each of the majority of intersections comprises a large weight. Similarly, the overall criticality of a particular computer program or a particular transaction is low when the particular computer program or the particular transaction is present in a minority of intersections and each of the minority of intersections comprises a low weight.

Figure 3:
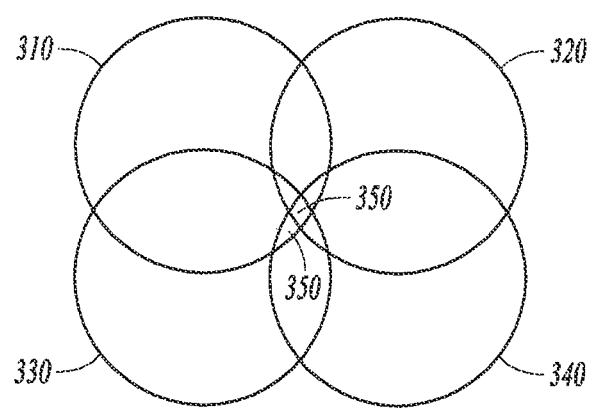
FIG. 3 is an example of a Venn-like diagram illustrating intersections of a plurality of sample spaces.

FIG. 3 is a Venn-like diagram illustrating the intersections of the sample spaces. While there are five sample spaces in this example embodiment, only four sample spaces and their intersections can be illustrated in a two dimensional format. In FIG. 3, the first (310), second (320), fourth (330), and fifth (340) sample spaces are illustrated. The intersection of the first, fourth, and fifth sample spaces is illustrated at 350.

The manner in which the system designates one or more programs or transactions as critical in a sample space is as follows. The system ranks the measures of a sample space, and then takes a top percentage or bottom percentage of that ranking. The percentage can be any value, for example a value of 10% such that the top 10% of the values and/or the bottom 10% of the values of a sample space are critical. In sample spaces wherein both the top and bottom percentages are considered critical, the values for the top and bottom percentages need not be equal. The measure of a sample space is determined as follows.

$$h(a) = \frac{k}{n}$$

k=the number of results with a value of a.
n=the number of measured results.

$$\sum_{a=0}^{n} h(a) = 1$$

A manner in which the system determines the programs to designate in the first sample space as the most frequently executed is as follows. Using the above algorithm, a number of measured results is determined. For this sample space, the number of executions for all of the programs over a particular time period is summed. Then, for each program, the number of times that that program is executed during that time period is divided by the sum of the total executions for all of the programs. This provides for each program a ranking percentage of the frequency of program execution. The rankings can then be ordered, and the top percentage (10% or some other value) can be identified as critical within the first sample space.

A manner in which the system determines the transactions to designate in the second sample space as most frequently executed and least frequently executed is analogous to the determination of the programs that are most frequently executed as explained in the previous paragraph. Specifically, using the above algorithm, a number of measured results is determined. For this second sample space, the number of executions for all of the transactions over a particular time period is summed. Then, for each transaction, the number of times that that transaction is executed during that time period is divided by the sum of the total executions for all of the transactions. This provides for each transaction a ranking percentage of the frequency of transaction execution. The rankings can then be ordered, and the top percentage (10% or some other value) and bottom percentage (again, 10% or some other value) can be identified as critical within the second sample space.

A manner in which the system determines the transactions to designate in the third sample space as having the most number of users and the transactions as having the least number of users is as follows. Using the above algorithm, a number of measured results is determined. For this third sample space, the result has to be determinable without knowing how many users could be a result—a first customer may have 10,000 users, while another customer may have only 400 users. Therefore, for example, transaction A may have 100 users, transaction B may have 120 users, transaction C may have 140 users, transaction D may have 120 users, transaction E may have 200 users, transaction F may have 140 users, and transaction G may have 140 users. So, the number of transactions with 100 users is 1 (transaction A), the number of transactions with 120 users is 2 (transactions D, B), the number of transactions with 140 users is 3 (transactions C, F, and G), and the number of transactions with 200 users is 1 (transaction E). Since there are seven transactions of interest in this example (transactions A-G), it can be determined, using the above formula, that h(100 users)=1/7=0.1429; h(120 users)=2/7=0.2857; h(140 users)=3/7=0.4285; and h(200 users)=1/7=0.1429. This allows the determination, independent of the number of users, of the transactions to designate as critical (transactions A and E, with a value of 0.1429).

A manner in which the system determines the database tables that have experienced enough change in data to be designated as critical in the fourth sample space is as follows. Using the above algorithm, a number of measured results is determined. For this fourth sample space, the number of measured results is determined by summing the increase for all database tables in the system. Then, for each different database table, the amount of increase for that database table is divided by the summed total increase for all database tables. This provides for each database table a ranking percentage of the amount of increase for that database table. The rankings can then be ordered, and the top percentage (10% or some other value) can be identified as critical within the fourth sample space.

A manner in which the system determines the programs and transactions to designate as having the most execution time in the fifth sample space is as follows. Using the above algorithm, a number of measured results is determined. For this fifth sample space, the number of measured results is determined by summing the aggregate program execution time for all programs in the system. Then, for each different program in the system, the amount of execution time for each program in the system is divided by the total execution time for all programs in the system. This provides for each program in the system a ranking percentage of the execution time of that program in the system. The rankings can then be ordered, and the top percentage (10% or some other value) can be identified as critical within the fifth sample space. The calculations to determine the critical transactions having the most execution time are very similar.

Figure 2:
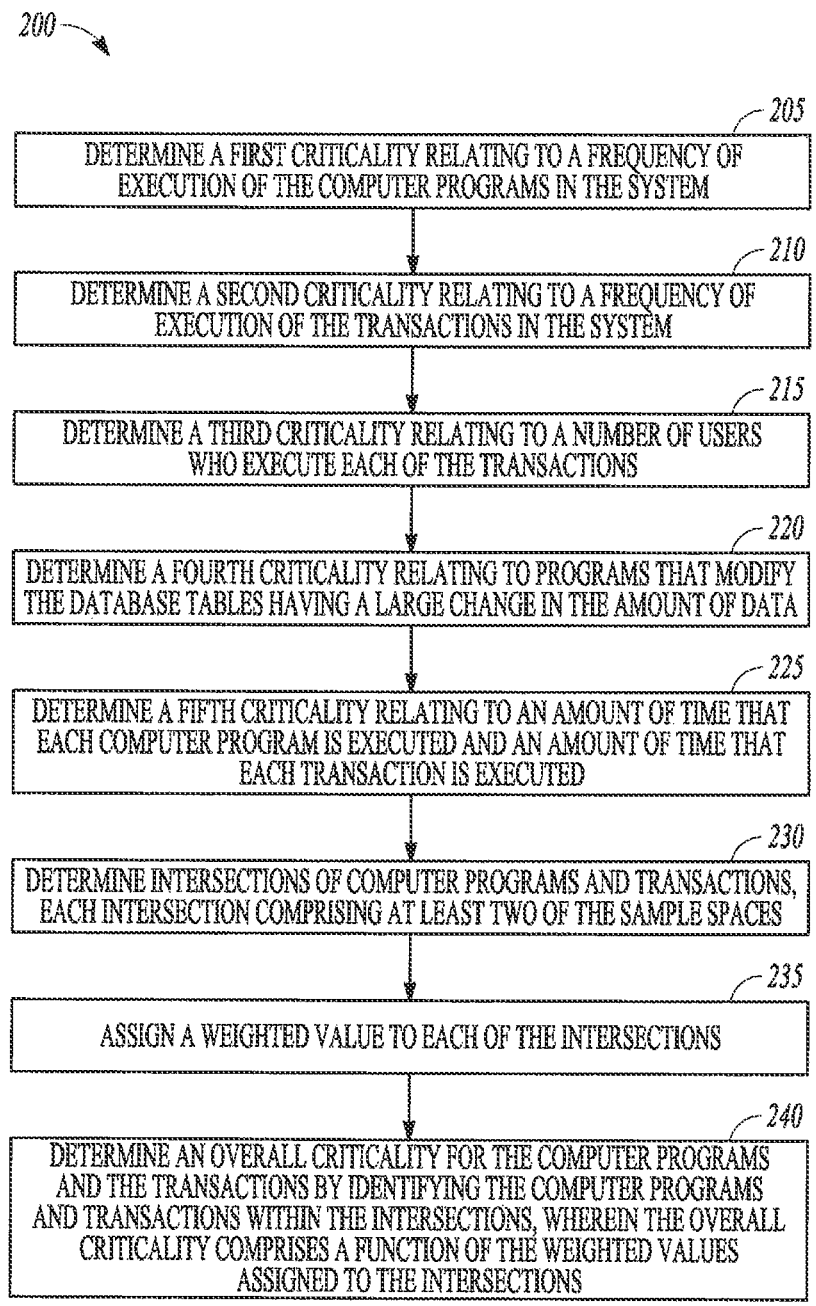
FIG. 2 is a flowchart-like diagram illustrating the features and process steps of another example embodiment of a system and method to identify business critical programs and transactions.

FIG. 2 is a flowchart-like diagram illustrating the features and process steps of another example embodiment of a system and method to identify business critical programs and transactions. At 205, a first criticality relating to a frequency of execution of computer programs in a system is determined. At 210, a second criticality relating to a frequency of execution of transactions in the system is determined. At 215, a third criticality relating to a number of users who execute each of the transactions is determined. At 220, a fourth criticality relating to programs that modify database tables having a large change in the amount of data is determined. At 225, a fifth criticality relating to an amount of time that each computer program is executed and an amount of time that each transaction is executed is determined.

At 230, intersections of computer programs and transactions are determined. Each intersection includes at least two sample spaces (or two of steps 210, 215, 220, and 230). At 235, a weighted value is assigned to each of the intersections. At 240, an overall criticality for a particular computer program or a particular transaction is determined. The overall criticality for the particular computer program or the particular transaction is a function of a number of intersections in which the particular computer program or the particular transaction appears and the weighted values assigned to the intersections.

Figure 4:
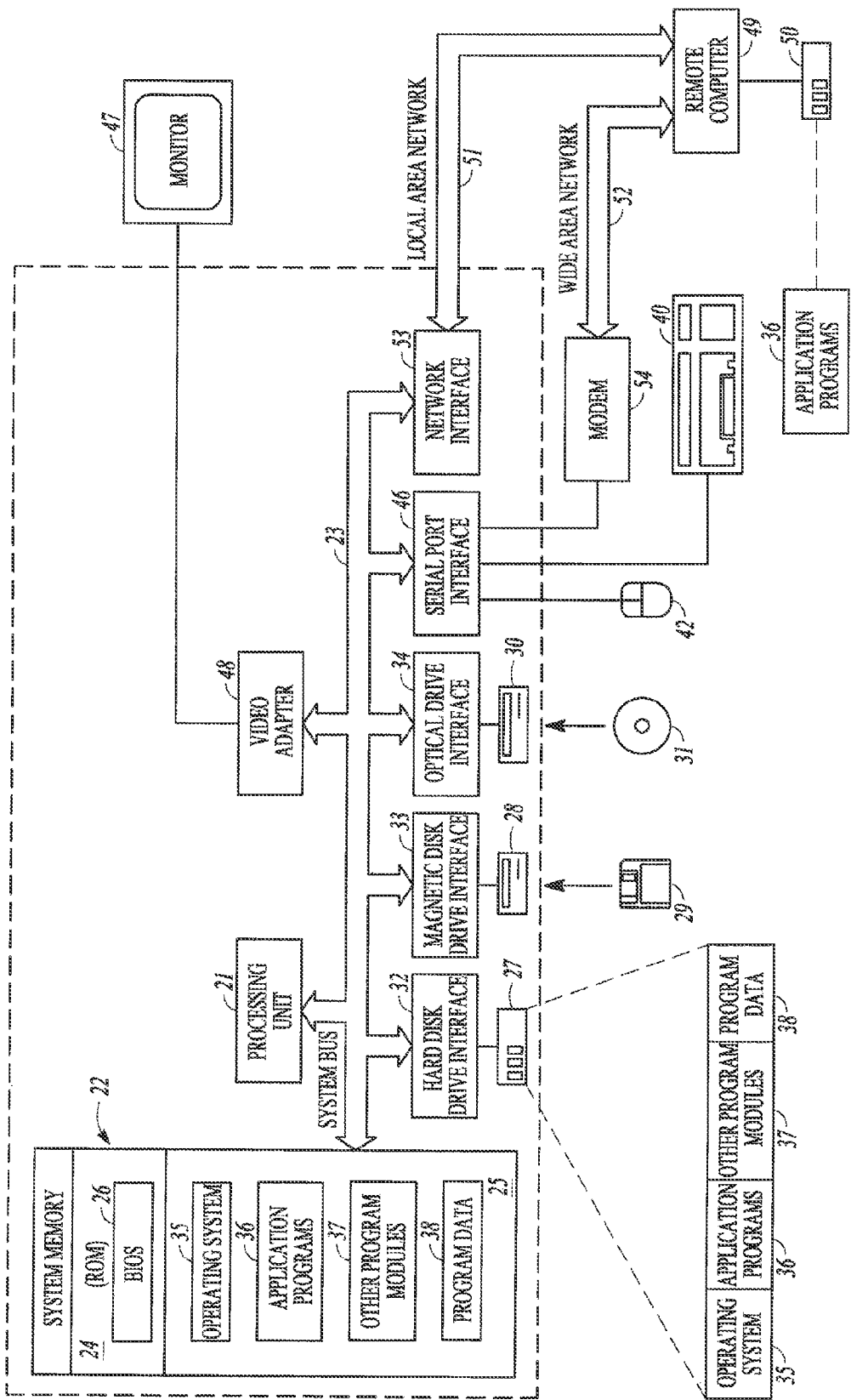
FIG. 4 is a block diagram of an example embodiment of a computer system upon which one or more of the embodiments disclosed herein can execute.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising: a computer storage device and a computer processor configured to: for at least two computer programs in the system, for at least two transactions in the system, and for at least two database tables in the system, performing the steps of:
    (a) determine a frequency of execution of the computer programs in the system, and designate as critical, in a first sample space, frequently executed computer programs whose frequency of execution is above a first threshold;
    (b) determine a frequency of execution of the transactions in the system, and designate as critical, in a second sample space, frequently executed transactions whose frequency of execution is above a second threshold, and designate as critical, in the second sample space, sporadically executed transactions whose frequency of execution is below a third threshold;
    (c) determine a number of users who execute each of the transactions, and designate as critical, in a third sample space, the transactions having a large number of users whose number of users is above a fourth threshold and designate as critical, in the third sample space, the transactions having a small number of users whose number of users is below a fifth threshold;
    (d) determine from the computer programs and the transactions that are associated with each of the database tables, whether a change occurs in an amount of data in each of the database tables; identify database tables having a large change in the amount of data, and designate as critical, in a fourth sample space, computer programs and transactions that modify the database tables with the largest change in the amount of data above a sixth threshold,
    (e) determine an amount of time that each computer program is executed and an amount of time that each transaction is executed, and designate as critical, in a fifth sample space, the computer programs having an execution time above a seventh threshold and the transactions with a large amount of execution time above an eighth threshold;

determine intersections of computer programs and transactions by: generating a plurality of particular groupings from selections of two or more sample spaces (a), (b), (c), (d), and (e) and for each grouping examining the identified critical computer programs or transactions of the sample spaces of the particular grouping to determine an intersection of computer programs or transactions; and assign a weighted value to each of the intersections; and
    determine an overall criticality for a particular computer program or a particular transaction, wherein the overall criticality for the particular computer program or the particular transaction comprises a function of a number of intersections in which the particular computer program or the particular transaction appears and the weighted values assigned to the intersections.

2. The system of claim 1, wherein the overall criticality of the particular computer program or the particular transaction is high when the particular computer program or the particular transaction is present in a majority of intersections and each of the majority of intersections comprises a large weight.

3. The system of claim 1, wherein the overall criticality of the particular computer program or the particular transaction is low when the particular computer program or the particular transaction is present in a minority of intersections and each of the minority of intersections comprises a low weight.

4. The system of claim 1, wherein the first, second, third, fourth, fifth, sixth, seventh, and eighth thresholds comprise an equal value.

5. The system of claim 1, wherein the first, second, third, fourth, fifth, sixth, seventh, and eighth thresholds comprise at least one different value.

6. The system of claim 4 or 5, wherein the value comprises a percentage of approximately 10%.

7. A system method executed on a computer processor to perform the steps of:
    (a) determine a first criticality, in a first sample space, relating to a frequency of execution of processes comprising designating as critical, in the first sample space, frequently executed processes that are above a first threshold and designating as critical, in the first sample space, sporadically executed processes that are below a second threshold;
    (b) determine a second criticality relating to a number of users, in a second sample space, who execute processes comprising designating as critical the processes having a large number of users above a third threshold and designating as critical, in the second sample space, the processes having a small number of users below a fourth threshold;
    (c) determine a third criticality, in a third sample space, relating to processes that modify the database tables having a large change in the amount of data comprising determining the processes that are associated with each of the database tables, determining a change in an amount of data in each of the database tables, identifying database tables having a large change in the amount of data and designating as critical, in the third sample space, processes that modify the database tables having the largest change in the amount of data whose change in data is above a fifth threshold;
    (d) determine a fourth criticality, in a fourth sample space, relating to an amount of time that each process is executed comprising designating as critical the processes with a large amount of execution time above a sixth threshold;

determine intersections of processes by: generating a plurality of particular groupings from selections of two or more sample spaces of (a), (b), (c), and (d) for each grouping examining the identified processes of the sample spaces of the particular grouping to determine an intersection of processes; and assign a weighted value to each of the intersections; and determine an overall criticality for a particular process, wherein the overall criticality for the particular process comprises a function of a number of intersections in which the particular process appears and the weighted values assigned to the intersections.

8. The method of claim 7, wherein the overall criticality of the particular process is high when the particular process is present in a majority of intersections and each of the majority of intersections comprises a large weight.

9. The method of claim 7, wherein the overall criticality of the particular process is low when the process is present in a minority of intersections and each of the minority of intersections comprises a low weight.

10. A non-transitory computer readable storage device comprising instructions that when executed by a processor execute a process comprising:

(a) determining a frequency of execution of computer programs, in a first sample space, in a system, and designating as critical, in the first sample space, frequently executed computer programs whose frequency of execution is above a first threshold;

(b) determining a frequency of execution of transactions, in a second sample space, in the system, and designating as critical, in the second sample space, frequently executed transactions whose frequency of execution are above a second threshold and designating as critical, in the second sample space, sporadically executed transactions whose frequency of execution is below a third threshold;

(c) determining a number of users who execute each of the transactions, in a third sample space, and designating as critical the transactions having a large number of users, whose number of users is above a fourth threshold, and designating as critical in the third sample space, the transactions having a small number of users whose number of users is below a fifth threshold;

(d) determining from the computer programs and the transactions, in a fourth sample space, that are associated with each of the database tables, determining a change in an amount of data in each of the database tables, identifying database tables having a large change in the amount of data, whose change in data is above a sixth threshold, and designating as critical, in the fourth sample space, programs that modify the database tables having the large change in the amount of data;

(e) determining an amount of time that each computer program, in a fifth sample space, is executed having an execution time above a seventh threshold and an amount of time that each transaction is executed, and designating as critical, in the fifth sample space, the computer programs and the transactions with a large amount of execution time having an execution time above an eighth threshold;

determining intersections of computer programs and transactions by: generating a plurality of particular groupings from selections of two or more sample spaces (a), (b), (c), (d), and (e) and for each grouping examining the identified critical computer programs or transactions of the sample spaces of the particular grouping to determine an intersection of computer programs or transactions; and assigning a weighted value to each of the intersections; and determining an overall criticality for a particular computer program or a particular transaction, wherein the overall criticality for the particular computer program or the particular transaction comprises a function of a number of intersections in which the particular computer program or the particular transaction appears and the weighted values assigned to the intersection.

11. The computer readable storage device of claim 10, wherein the overall criticality of the particular computer program or the particular transaction is high when the particular computer program or the particular transaction is present in a majority of intersections and each of the majority of intersections comprises a large weight; and wherein the overall criticality of the particular computer program or the particular transaction is low when the particular computer program or the particular transaction is present in a minority of intersections and each of the minority of intersections comprises a low weight.

12. A method executed on a computer processor to perform the steps of:

(a) determining a frequency of execution of the computer programs, in a first sample space in the system, and designating as critical, in the first sample space, frequently executed computer programs whose frequency of execution is above a first threshold;

(b) determining a frequency of execution of the transactions, in a second sample space in the system whose frequency of execution is above a second threshold, and designating as critical, in the second sample space, frequently executed transactions and designating as critical, in the second sample space, sporadically executed transactions whose frequency of execution is below a third threshold, (c) determining a number of users who execute each of the transactions, in a third sample space, and designating as critical the transactions having a large number of users whose number of users is above a fourth threshold and designating as critical, in the third sample space, the transactions having a small number of users whose number of users is below a fifth threshold;

(d) determining the computer programs and the transactions that are associated with each of the database tables, in a fourth sample space, determining change in an amount of data in each of the database tables, identifying database tables having a large change in the amount of data whose change in data is above a sixth threshold, and designating as critical, in the fourth sample space, programs that modify the database tables having the large change in the amount of data;

(e) determining an amount of time that each computer program, in a fifth sample space, is executed and an amount of time that each transaction is executed, and designating as critical, in the fifth sample space, the computer programs having an execution time above a seventh threshold and the transactions with a large amount of execution time having an execution time above an eighth threshold;

determining intersections of computer programs and transactions by: generating a plurality of particular groupings from selections of two or more of sample spaces (a), (b), (c), (d), and (e) and for each grouping examining the identified critical computer programs or transactions of the sample spaces of the particular grouping to determine an intersection of computer programs or transactions; and assigning a weighted value to each of the intersections; and determining an overall criticality for a particular computer program or a particular transaction, wherein the overall criticality for the particular computer program or the particular transaction comprises a function of a number of intersections in which the particular computer program or the particular transaction appears and the weighted values assigned to the intersections.

13. The method of claim 12, wherein the overall criticality of the particular computer program or the particular transaction is high when the particular computer program or the particular transaction is present in a majority of intersections and each of the majority of intersections comprises a large weight; and wherein the overall criticality of the particular computer program or the particular transaction is low when the particular computer program or the particular transaction is present in a minority of intersections and each of the minority of intersections comprises a tow weight.

14. The method of claim 12, wherein the amount of time that each computer program is executed and the amount of time that each transaction is executed comprises a maximum amount of execution time.

15. A system comprising: a computer storage device and a computer processor configured to: for at least two processes in the system, and for at least two database tables in the system, performing the steps of:
(a) determine a frequency of execution of processes in the system, in a first sample space, and designate as critical frequently executed processes above a first threshold and designate as critical, in the first sample space, sporadically executed processes below a second threshold;
(b) determine a number of users who execute each of the processes, in a second sample space, and designate as critical the processes having a large number of users whose number of users is above a third threshold and designate as critical, in the second sample space, the processes having a small number of users whose number of users is below a fourth threshold;
(c) determine the processes that are associated with particular database tables, in a third sample space, determine a change in an amount of data in each of the database tables, identify, database tables having a large change in the amount of data, and designate as critical, in the third sample space, processes that modify the database tables having the largest change in the amount of data above a fifth threshold;
(d) determine an amount of time that each process is executed, in a fourth sample space, and designate as critical the processes with a large amount of execution time above a sixth threshold;

determine intersections of processes by: generating a plurality of particular groupings from selections of two or more of sample spaces (a), (b), (c), and (d) and for each grouping examining the identified critical processes of the sample spaces of the particular grouping to determine an intersection of processes; and assign a weighted value to each of the intersections; and determine an overall criticality for a particular process, wherein the overall criticality for the particular process comprises a function of a number of intersections in which the particular process appears and the weighted values assigned to the intersections.

16. A non-transitory computer readable storage device comprising instructions that when executed by a processor execute a process comprising:
(a) determine a frequency of execution of processes in the system, in a first sample space, and designate as critical frequently executed processes above a first threshold and designate as critical sporadically executed processes below a second threshold;
(b) determine a number of users who execute each of the processes, in a second sample space, and designate as critical the processes having a large number of users whose number of users is above a third threshold and designate as critical, in the second sample space, the processes having a small number of users whose number of users is below a fourth threshold;
(c) determine the processes that are associated with particular database tables, in a third sample space, determine a change in an amount of data in each of the database tables, identify, database tables having a large change in the amount of data, and designate as critical, in the third sample space, processes that modify the database tables having the largest change in the amount of data above a fifth threshold;
(d) determine an amount of time that each process is executed, in a fourth sample space, and designate as critical the processes with a large amount of execution time above a sixth threshold;

determine intersections of processes by: generating a plurality of particular groupings from selections of two or more sample spaces (a), (b), (c), and (d) and for each grouping examining the identified critical processes of the sample spaces of the particular grouping to determine an intersection of processes; and assign a weighted value to each of the intersections; and determine an overall criticality for a particular process, wherein the overall criticality for the particular process comprises a function of a number of intersections in which the particular process appears and the weighted values assigned to the intersections.

* * * * *